(12) United States Patent
Randle

(10) Patent No.: US 9,382,954 B2
(45) Date of Patent: Jul. 5, 2016

(54) TEMPERATURE COMPENSATED TORQUE LIMITING VALVE

(71) Applicant: GM Global Technology Operations LLC, Detroit, MI (US)

(72) Inventor: Grant M. Randle, Kensington (AU)

(73) Assignee: GM Global Technology Operations, LLC, Detroit, MI (US)

( * ) Notice: Subject to any disclaimer, the term of this patent is extended or adjusted under 35 U.S.C. 154(b) by 113 days.

(21) Appl. No.: 14/285,165

(22) Filed: May 22, 2014

(65) Prior Publication Data

US 2015/0337912 A1    Nov. 26, 2015

(51) Int. Cl.
*F16D 43/25*    (2006.01)
*F16D 48/02*    (2006.01)

(52) U.S. Cl.
CPC ........ *F16D 48/02* (2013.01); *F16D 2048/0221* (2013.01); *F16D 2048/0266* (2013.01)

(58) Field of Classification Search
CPC ............... F16D 2048/0221; F16D 2048/0266; F16D 48/02
See application file for complete search history.

(56) References Cited

U.S. PATENT DOCUMENTS

| 5,967,285 | A | * | 10/1999 | Mohan | ................ | F16D 25/0638 |
| | | | | | | 192/103 F |
| 6,343,541 | B1 | | 2/2002 | Ebert et al. | | |
| 6,607,060 | B2 | * | 8/2003 | Inoue | ................... | F16D 25/088 |
| | | | | | | 192/83 |
| 6,802,791 | B1 | * | 10/2004 | Yoshioka | ............... | F15B 21/045 |
| | | | | | | 137/539 |
| 7,556,133 | B2 | | 7/2009 | de Salis et al. | | |
| 2004/0000341 | A1 | * | 1/2004 | Kim | ........................ | F16K 17/08 |
| | | | | | | 137/513.3 |
| 2004/0223851 | A1 | * | 11/2004 | Shiozaki | ................. | F01P 7/042 |
| | | | | | | 417/15 |
| 2006/0157660 | A1 | * | 7/2006 | Muller | ................ | F16K 31/1245 |
| | | | | | | 251/25 |
| 2007/0137715 | A1 | * | 6/2007 | Ichikawa | .................. | F16D 4/02 |
| | | | | | | 137/858 |
| 2007/0175727 | A1 | * | 8/2007 | de Salis | .................. | F16D 48/02 |
| | | | | | | 192/85.63 |
| 2010/0276022 | A1 | * | 11/2010 | Moosmann | ............. | F16D 48/02 |
| | | | | | | 137/613 |
| 2012/0085614 | A1 | * | 4/2012 | Martin | ................ | F16D 48/0206 |
| | | | | | | 192/48.601 |

FOREIGN PATENT DOCUMENTS

EP    2345825 A1    7/2011

* cited by examiner

*Primary Examiner* — David J Hlavka

(57) ABSTRACT

A flow limiting and temperature compensated orifice assembly includes a valve body having an orifice and a plurality of exterior bypass channels or openings. The valve body is disposed in a complementary cylindrical chamber in a housing in the fluid line which also receives a bi-metallic disc and a rubber washer. The bi-metallic disc is disposed adjacent one end of the body and defines a center opening which aligns with the orifice opening. In a first, higher temperature position or state, the bi-metallic disc engages the adjacent end face of the body and closes off flow through the exterior channels and allows fluid flow only through the flow limiting and thus torque controlling orifice. In a second, lower temperature position or state, the bi-metallic disc has flipped and moved away from the end face of the body and allows fluid flow through the exterior bypass channels as well as the orifice opening.

19 Claims, 2 Drawing Sheets

TEMPERATURE COMPENSATED TORQUE LIMITING VALVE

FIELD

The present disclosure relates to torque limiting valves for motor vehicle clutches and more particularly to a temperature compensated torque limiting valve for a clutch in a motor vehicle driveline.

BACKGROUND

The statements in this section merely provide background information related to the present disclosure and may or may not constitute prior art.

In conventional manual transmissions, it is possible, during very rapid clutch engagement, for the rate of torque increase across and through driveline components to equal or exceed their rated strengths. This can result in increased warranty issues and, ultimately, reduced service life of the components.

A peak torque limiting valve with a fixed orifice installed in the hydraulic fluid line between the clutch master and slave cylinders can be used to limit the flow rate of hydraulic fluid out of the slave cylinder and thus the engagement rate of the clutch such that the rate of increase of torque through the driveline components is also limited.

This approach to controlling maximum rate of torque increase in the vehicle driveline provides a viable solution in most instances. However, under low temperature conditions, the clutch hydraulic fluid will be more viscous and with lower and lower temperatures, the flow rate through the fixed orifice reduces correspondingly. This reduced flow rate under cold temperature conditions results in reduced clutch engagement rate as well as providing a clutch pedal feel which is anomalous and generally does not meet the customer's expectations. In extreme situations, when the clutch is released, the pedal may not return (rise) at the rate the driver raises his or her foot. The present invention addresses all of these issues.

SUMMARY

The present invention provides a flow limiting and torque controlling orifice assembly for a hydraulic clutch circuit having temperature compensation. The flow limiting and temperature compensated orifice assembly includes a valve body or insert having a centrally disposed orifice opening and a plurality of exterior bypass channels or openings. The body or insert is disposed in a complementary cylindrical chamber in a housing in the fluid line which also receives a bi-metallic disc and a rubber washer. The bi-metallic disc is disposed adjacent one end of the body or insert and defines a center opening which aligns with the orifice opening. In a first, higher temperature position or state, the bi-metallic disc engages the adjacent end face of the body or insert and closes off flow through the exterior bypass channels and allows fluid flow only through the flow limiting and thus torque controlling orifice. In a second, lower temperature position or state, the bi-metallic disc has flipped and moved away from the end face of the valve body or insert and allows fluid flow through the exterior bypass channels as well as the orifice opening. Accordingly, during lower temperature operation, significantly higher flow rates can be achieved through the temperature compensated flow controlling orifice assembly to compensate for the increased viscosity of the clutch fluid, thereby providing essentially normal vehicle launch, clutch operation, engagement and feel.

It is thus an aspect of the present invention to provide a temperature compensated flow limiting orifice assembly.

It is a further aspect of the present invention to provide a temperature compensated flow limiting orifice assembly for a manual clutch for a motor vehicle.

It is a still further aspect of the present invention to provide a temperature compensated flow limiting orifice assembly having a body or insert with a center orifice opening and a plurality of exterior channels.

It is a still further aspect of the present invention to provide a temperature compensated flow limiting orifice assembly having a bi-metallic disc having a first state which allows flow through the orifice and a second state which allows flow through a plurality of channels.

It is a still further aspect of the present invention to provide a temperature compensated flow limiting orifice assembly having a temperature sensitive flow controller having a first state which allows a smaller flow per unit of time and a second state which allows a larger flow per unit of time.

It is a further aspect of the present invention to provide a temperature compensated flow limiting orifice assembly for a motor vehicle clutch which provides essentially normal vehicle launch, clutch operation and clutch feel under cold temperature conditions.

Further aspects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
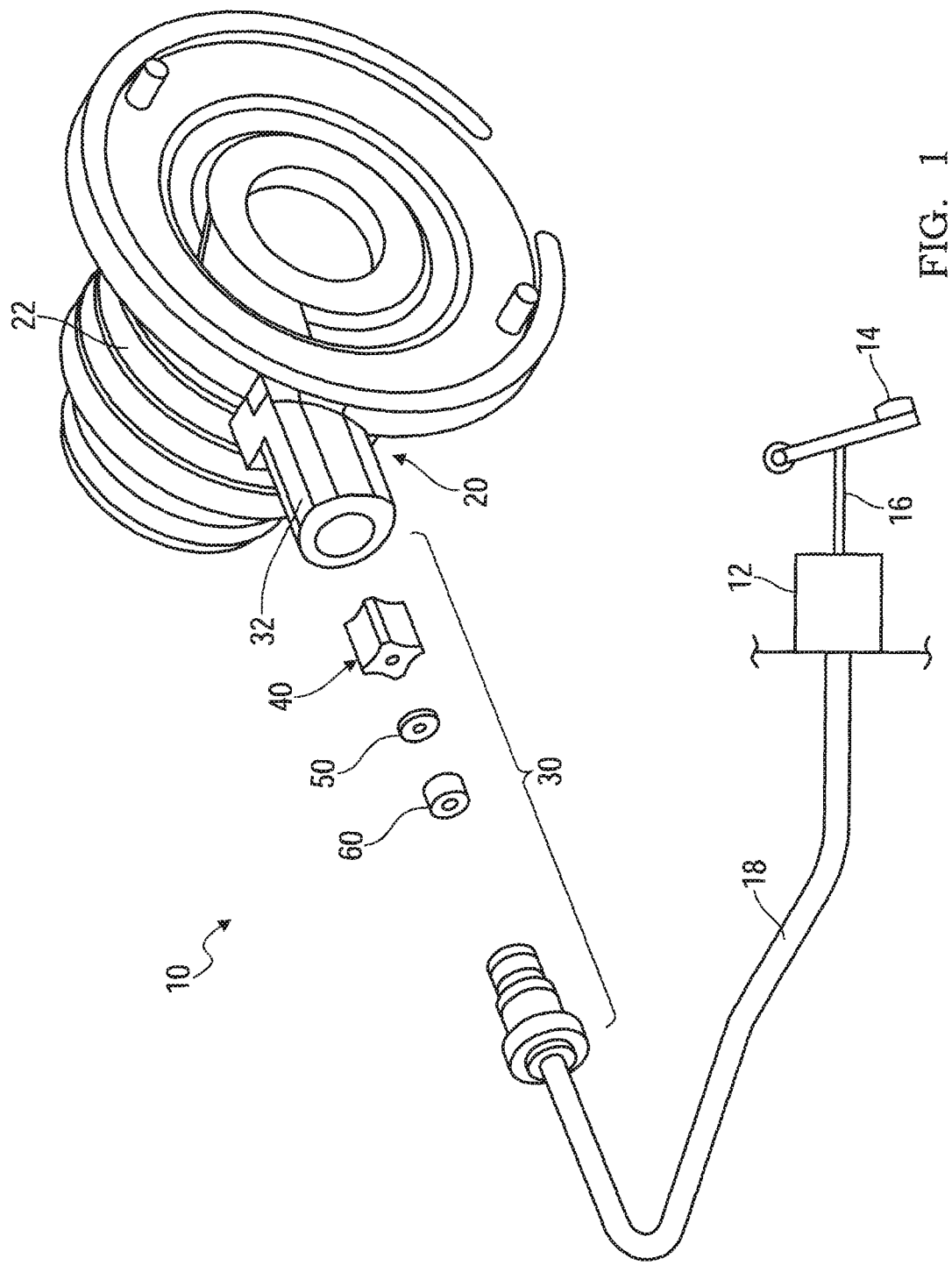
FIG. 1 is an exploded perspective view of a motor vehicle clutch, slave cylinder and a temperature compensated flow limiting orifice assembly according to the present invention.

With reference to FIG. 1, a hydraulic circuit for a hydraulic motor vehicle driveline clutch is illustrated and generally designated by the reference number 10. The hydraulic circuit includes a master cylinder 12 which is activated by the vehicle operator through a foot pedal 14 and linkage 16. The hydraulic fluid output of the master cylinder 12 is carried in a hydraulic line 18 to a slave cylinder 20 associated with and acting upon a manual driveline clutch 22.

Figure 2:
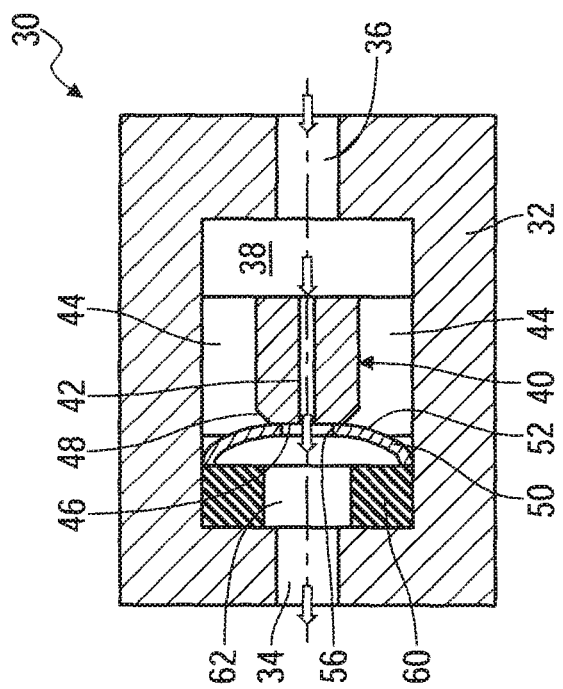
FIG. 2 is a full sectional view of a temperature compensated flow limiting orifice assembly according to the present invention in a first higher temperature and flow limiting state.
Figure 3:
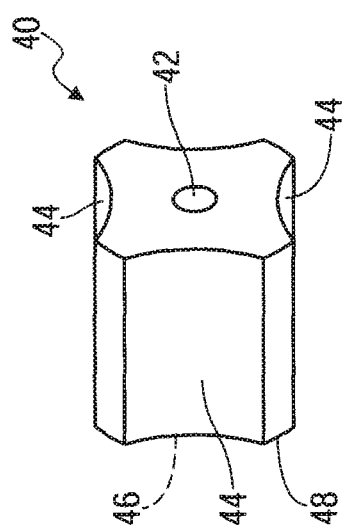
FIG. 3 is an enlarged perspective view of the valve body or insert of a temperature compensated flow limiting orifice assembly according to the present invention.

With reference now to FIGS. 1, 2 and 3, operably disposed in the hydraulic line 18 between the master cylinder 12 and the slave cylinder 20 is a temperature compensated flow limiting orifice assembly 30. The temperature compensated flow limiting orifice assembly 30 is disposed in a housing 32 having a first or inlet port 34 communicating with the master cylinder 12 through the hydraulic line 18 and a second or outlet port 36 communicating with the slave cylinder 20. Conveniently, the housing 32 of the temperature compensated flow limiting orifice assembly 30 may be mounted adjacent, attached to or be an integral component, portion or feature of the slave cylinder 20.

The housing 32 of the temperature compensated flow limiting orifice assembly 30 defines or includes a central, preferably cylindrical interior chamber or cavity 38 which communicates with and allows hydraulic fluid flow between the first or inlet port 34 and the second or outlet port 36. Disposed for free axial translation within the cavity 38 of the housing 32 is an orifice or valve body or insert 40.

Referring now particularly to FIG. 3, the orifice or valve body or insert 40 includes or defines a center axial orifice or passageway 42 which is appropriately sized to provide suitable limiting of hydraulic clutch fluid flow to properly control engagement of the clutch 22 and limit torque delivery to the vehicle driveline under normal temperature conditions. The orifice body or insert 40 also includes at least one and preferably a plurality of exterior, axial channels or passageways 44. While the valve body or insert 40 illustrated includes four such channels or passageways 44, it should be appreciated the fewer, such as two or three, or more, such as five, six or eight, for example, may be included. The orifice body or insert further includes a shallow concave recess or circular depression surface 46 in the end 48 of the valve body or insert 40 adjacent the first or inlet port 34.

Referring again to FIG. 2, the concave recess or circular depression surface 46 in the end 48 of the body or insert 40 is complementary to the shape, in a first or normal temperature state or condition, of a bi-metallic washer or disc 50. That is, the bi-metallic washer or disc 50 defines a first curved or radiused shape, generally similar to a segment of a sphere which, in its normal temperature state, has a convex surface 52 adjacent and in contact with the concave recess 46 in the end 48 of the body or insert 40.

Figure 4:
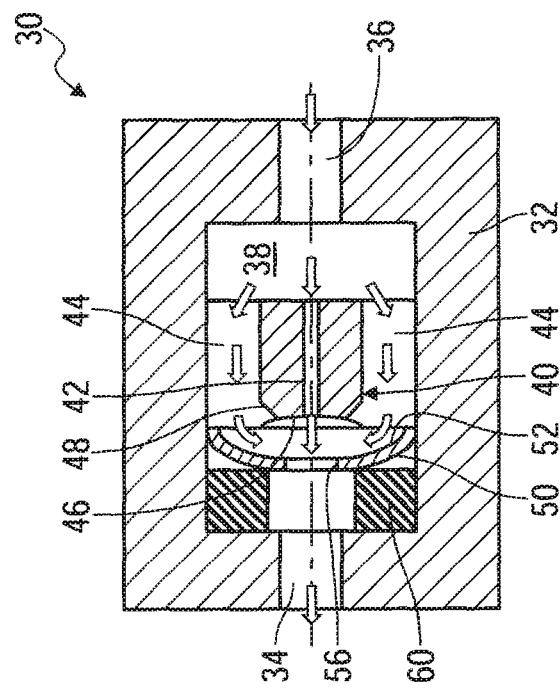
FIG. 4 is a full sectional view of a temperature compensated flow limiting orifice assembly according to the present invention in a second lower temperature state providing maximum fluid flow.

In a second low temperature state or condition, the bi-metallic washer or disc 50 reverses or "flips" its shape such that the convex surface 52 is now concave and the bi-metallic washer or disc 50 therefore moves well away from the concave recess or surface 46 in the end 48 of the body or insert 40, as illustrated in FIG. 4. The bi-metallic washer or disc 50 also includes or defines a center opening or aperture 56 that is significantly larger in diameter than the diameter of the orifice or passageway 42 in the orifice body or insert 40 such that it provides a significantly larger and less restricted fluid flow path than the orifice or passageway 42.

The bi-metallic washer or disc 50 may be fabricated of any two hydraulic fluid compatible materials, preferably metals, having distinct coefficients of thermal expansion. For example, steel and copper or steel and brass may be intimately bonded together, according to conventional manufacturing techniques, to form the two sides (faces) of the bi-metallic washer or disc 50.

Adjacent the side or face of the bi-metallic washer or disc 50 which is concave during normal temperature operation resides a rubber disc or washer 60. The rubber disc or washer 60 defines a center opening or passageway 62 which preferably aligns with the first inlet or port 34, the center opening or aperture 56 in the bi-metallic washer or disc 50 and the orifice or passageway 42. The rubber disc or washer 60 provides a resilient and compressible feature which the bi-metallic washer or disc 50 engages and seals against.

Referring now particularly to FIGS. 2 and 4, the operation of the temperature compensated flow limiting orifice assembly 30 will be described. During normal temperature operation, nominally and conveniently defined as above 32° F. (0° C.), the bi-metallic washer or disc 50 is in the state and condition (shape) illustrated in FIG. 2. Here, the convex surface 52 of the bi-metallic washer or disc 50 is in intimate contact with the concave recess surface 46, thus closing off fluid flow through the exterior, axial channels or passageways 44 and limiting fluid flow to that passing through the center orifice or passageway 42. As noted above, this orifice or passageway 42 is sized to limit fluid flow to and especially from the clutch slave cylinder 20 to control the maximum rate of clutch engagement and thus maximum rate of torque increase in the driveline.

At colder temperatures, nominally and conveniently defined as below 32° F. (0° C.), the conditions presented in FIG. 4 prevail. Here, the bi-metallic washer or disc 50 has snapped or reversed its shape from the normal temperature condition illustrated in FIG. 2, such that not only is the convex surface 52 no longer in contact with the concave recess surface 46 but also it is now concave, not convex. Hence, a fluid flow path through the exterior, axial channels or passageways 44 of the orifice body 40 is established (in addition to the fluid flow path through the orifice or passageway 42) and, notwithstanding the increased viscosity of the hydraulic fluid at such lower temperature, the increased fluid flow rate through the temperature compensated flow limiting orifice assembly 30 is such that essentially normal clutch operation and feel is achieved.

It should be appreciated that the threshold between normal and cold temperatures (32° F. (0° C.)) recited above is for purposes of example and illustration only and, further, that such temperature threshold may be adjusted up or down as vehicles, drivelines, performance criteria, geographic conditions and applications vary.

The foregoing description of the invention is merely exemplary in nature and variations that do not depart from the gist of the invention are intended to be, and are considered to be, within the scope of the invention. Such variations are not to be regarded as a departure from the spirit and scope of the invention.

What is claimed is:

1. A temperature compensated flow limiting assembly for a driveline clutch comprising, in combination,
    a housing having a fluid passageway, an inlet port and an outlet port,
    a body disposed in said fluid passageway between said inlet port and said outlet port, said body having an orifice and at least one flow path bypassing said orifice, and
    a bi-metallic disc disposed adjacent said body, said disc having an opening aligned with said orifice in said body,
    wherein a first state of said bi-metallic disc directs fluid flow between said inlet port and said outlet port through said orifice and a second state of said bi-metallic disc allows fluid flow at least through said at least one flow path bypassing said orifice.

2. The temperature compensated flow limiting assembly of claim 1 further including a resilient washer disposed in said passageway between said bi-metallic disc and said housing.

3. The temperature compensated flow limiting assembly of claim 2 wherein said resilient washer includes a center opening and said center opening is aligned with said opening in said bi-metallic disc and said orifice in said body.

4. The temperature compensated flow limiting assembly of claim 1 wherein said at least one flow path includes a plurality of exterior channels in said body.

5. The temperature compensated flow limiting assembly of claim 1 wherein said at least one flow path includes a plurality of passageways parallel to said orifice.

6. The temperature compensated flow limiting assembly of claim 1 wherein said body includes an end adjacent said inlet port and a concave surface on said end of said body adapted to engage said bi-metallic disc in said first state.

7. The temperature compensated flow limiting assembly of claim 1 wherein said body may translate axially within said fluid passageway.

8. A temperature compensated flow limiting assembly for a manual clutch comprising, in combination,
    a housing having a fluid passageway, an inlet and an outlet,
    a body disposed in said fluid passageway between said inlet port and said outlet port, said body having a orifice passageway and at least one bypass passageway bypassing said orifice passageway, and
    a temperature sensitive disc disposed at an end of said body, said disc having an opening aligned with said orifice passageway and having a first state at a first higher temperature wherein fluid flow through said fluid passageway in said housing is restricted to said orifice passageway and a second state at a second temperature lower than said first temperature wherein fluid flow through said passageway in said housing passes through both said orifice passageway and said at least one bypass passageway.

9. The temperature compensated flow limiting assembly of claim 8 further including a resilient washer having an opening disposed between said temperature sensitive disc and said housing.

10. The temperature compensated flow limiting assembly of claim 8 wherein said body includes an end adjacent said inlet port and a concave surface on said end of said body adapted to engage said temperature sensitive disc in said first state.

11. The temperature compensated flow limiting assembly of claim 8 wherein said at least one bypass passageway includes a plurality of exterior channels in said body.

12. The temperature compensated flow limiting assembly of claim 8 wherein said temperature sensitive disc is adjacent said inlet of said housing and said inlet communicates with a clutch master cylinder.

13. The temperature compensated flow limiting assembly of claim 8 wherein said body is adjacent said outlet of said housing and said outlet communicates with a clutch slave cylinder.

14. A temperature compensating flow limiting assembly for a manual driveline clutch comprising, in combination,
    a housing defining a fluid passageway, a first port at one end of said fluid passageway and a second port at another end of said fluid passageway,
    a body disposed in said fluid passageway between said first port and said second port, said body defining a flow limiting orifice and at least one flow path bypassing said orifice, and
    a temperature sensitive metal disc disposed adjacent said body, said disc having an opening aligned with said orifice in said body,
    wherein a first state of said temperature sensitive metal disc directs fluid flow between said first port and said second port through said orifice and a second state of said temperature sensitive metal disc allows fluid flow through both said orifice and said at least one flow path bypassing said orifice.

15. The temperature compensating flow limiting assembly of claim 14 wherein said body includes an end adjacent said first port and a concave surface on said end of said body adapted to engage said temperature sensitive disc in said first state.

16. The temperature compensating flow limiting assembly of claim 14 further including a resilient washer disposed between said temperature sensitive metal disc and said housing.

17. The temperature compensating flow limiting assembly of claim 14 wherein said temperature sensitive metal disc is adjacent said first port of said housing and said first port communicates with a clutch master cylinder.

18. The temperature compensating flow limiting assembly of claim 14 wherein said body is adjacent said second port of said housing and said second port communicates with a clutch slave cylinder.

19. The temperature compensating flow limiting assembly of claim 14 wherein said at least one flow path includes a plurality of exterior channels in said body.

\* \* \* \* \*